United States Patent
Li (10) Patent No.: US 6,686,793 B2
(45) Date of Patent: *Feb. 3, 2004

(54) GATE ENHANCED TRI-CHANNEL POSITIVE CHARGE PUMP

(75) Inventor: Bo Li, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/273,689

(22) Filed: Oct. 18, 2002

(65) Prior Publication Data

US 2003/0038670 A1 Feb. 27, 2003

Related U.S. Application Data (63) Continuation of application No. 09/753,045, filed on Dec. 29, 2000, now Pat. No. 6,496,055.

(51) Int. Cl.[7] .................................................. G05F 3/02
(52) U.S. Cl. ..................................... 327/536; 327/537
(58) Field of Search .................................. 327/534, 536, 327/537

(56) References Cited

U.S. PATENT DOCUMENTS

| 5,140,182 A | 8/1992 | Ichimura |
| 5,734,290 A | 3/1998 | Chang et al. |
| 5,754,476 A | 5/1998 | Caser et al. |
| 5,818,758 A | 10/1998 | Wojciechowski |
| 5,841,703 A | 11/1998 | Wojciechowski |
| 5,982,223 A | 11/1999 | Park et al. |
| 6,100,557 A | 8/2000 | Hung et al. |

Primary Examiner—Terry D. Cunningham
(74) Attorney, Agent, or Firm—Peter Lam (57) ABSTRACT

A gate enhanced tri-channel positive charge pump. The positive charge pump of one embodiment comprises a switching device to transfer charge from its input terminal to its output terminal, the switching terminal further comprising a substrate terminal coupled to the input terminal. A pull-up device is coupled to the switching device, the pull-up device to precharge a boot node, the pull-up device further comprising a substrate terminal couple to the input terminal of the switching device. A pull-down device is coupled to the switching device, the pull-down device to discharge the boot node, the pull-down device further comprising a substrate terminal coupled to the input terminal of the switching device. The pump also comprises a control device coupled to the pull-down device, the control device to enable and disable the pull-down device, the control device further comprising a substrate terminal coupled to a drain terminal of the control device.

19 Claims, 7 Drawing Sheets

GATE ENHANCED TRI-CHANNEL POSITIVE CHARGE PUMP

This patent application is a Continuation of U.S. patent application Ser. No. 09/753,045, now U.S. Pat. No. 6,496,055 entitled "Gate Enhanced Tri-channel Positive Charge Pump", filed Dec. 29, 2000.

FIELD OF THE INVENTION

The present invention relates generally to the field of computers and computer systems. More particularly, the present invention relates to a gate enhanced tri-channel positive charge pump.

BACKGROUND OF THE INVENTION

Many of today's computing applications such as cellular phones, digital cameras, and personal computers, use non-volatile memories to store data or code. Nonvolatility is advantageous because it allows the computing system to retain its data and code even when power is removed from the computing system. Thus if the system is turned off or if there is a power failure, there is no loss of code or data.

One example of a nonvolatile memory device is the flash Electrically Erasable Programmable Read-only Memory (flash EEPROM or flash memory). Flash memory can be programmed by the user, and once programmed, the flash memory retains its data until the memory is erased. Electrical erasure of the flash memory erases the contents of the memory of the device in one relatively rapid operation. The flash memory may then be programmed with new code or data.

Flash memories have been used in portable computers and similar circuitry as both read only memory and as long term storage which may be both read and written. However, the tendency has been to reduce the power requirements of such portable computers to make systems lighter and to increase the length of use between recharging. This has required that the voltage potentials available to program the flash memory arrays be reduced. Flash memories must be able to operate in systems where a VCC supply voltage of 5V, 3V, or an even smaller voltage is available to circuit components. However, performing program and erase operations in flash memory components requires that greater voltage than that supplied to the component be applied to the flash memory cells. For example, a program operation may require that approximately 10.5V be applied to a memory cell. In order to achieve this voltage, a charge pump circuit is required in the flash memory component. A positive charge pump can take a supplied VCC voltage and create a voltage sufficient for program operations. The charge pump must also be able to deliver sufficient current at the required voltage levels.

As lower supply voltages are used with integrated circuit components, semiconductor processing technology has continued to improved. Along with these developments are transistor devices with lower threshold voltages (Vt). However, these lower Vt levels can cause problems when the Vt is small relative to the VCC supply voltage. As a result, devices may accidentally turn on or leak charge at undesired times.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and apparatus for a gate enhanced tri-channel positive charge pump is disclosed. The embodiments described herein are described in the context of a memory, but are not so limited. Although the following embodiments are described with reference to flash memory, other embodiments are applicable to other integrated circuits or logic devices. The same techniques and teachings of the present invention can easily be applied to other types of circuits or semiconductor devices that use charge pumps.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

One embodiment of a tri-channel triple well NMOS positive charge pump in accordance with a simplified pump architecture is described below. In this implementation of the positive pump architecture, the deep N well of each transistor device is connected to its drain terminal. The P well in this implementation is also connected up to the deep N well. This gate enhancement switching architecture refers to the increased charge transfer in an N type transistor device in combination with triple well technology. Embodiments of the present invention configure a triple well N channel transistor device to intentionally create a vertical bipolar junction transistor (BJT) device and a horizontal BJT to help increase the charge transfer.

This use of the parasitic BJT devices is counter to normal design techniques wherein engineers take great efforts to avoid the activation of such parasitic devices as undesirable and destructive breakdown phenomena such as latchup or snapback can occur. The BJTs are formed when the N device's deep N well and the P well are connected to its drain terminal. By biasing the wells of the N type device with the potential at its drain in one embodiment, the body effect of the pump stages can be eliminated. The higher biased P well potential can also effectively reduce the threshold voltage $Vt_N$ of an N type transistor device. Lower voltage requirements to activate individual transistors can lead to power savings in the overall circuit.

Figure 1:
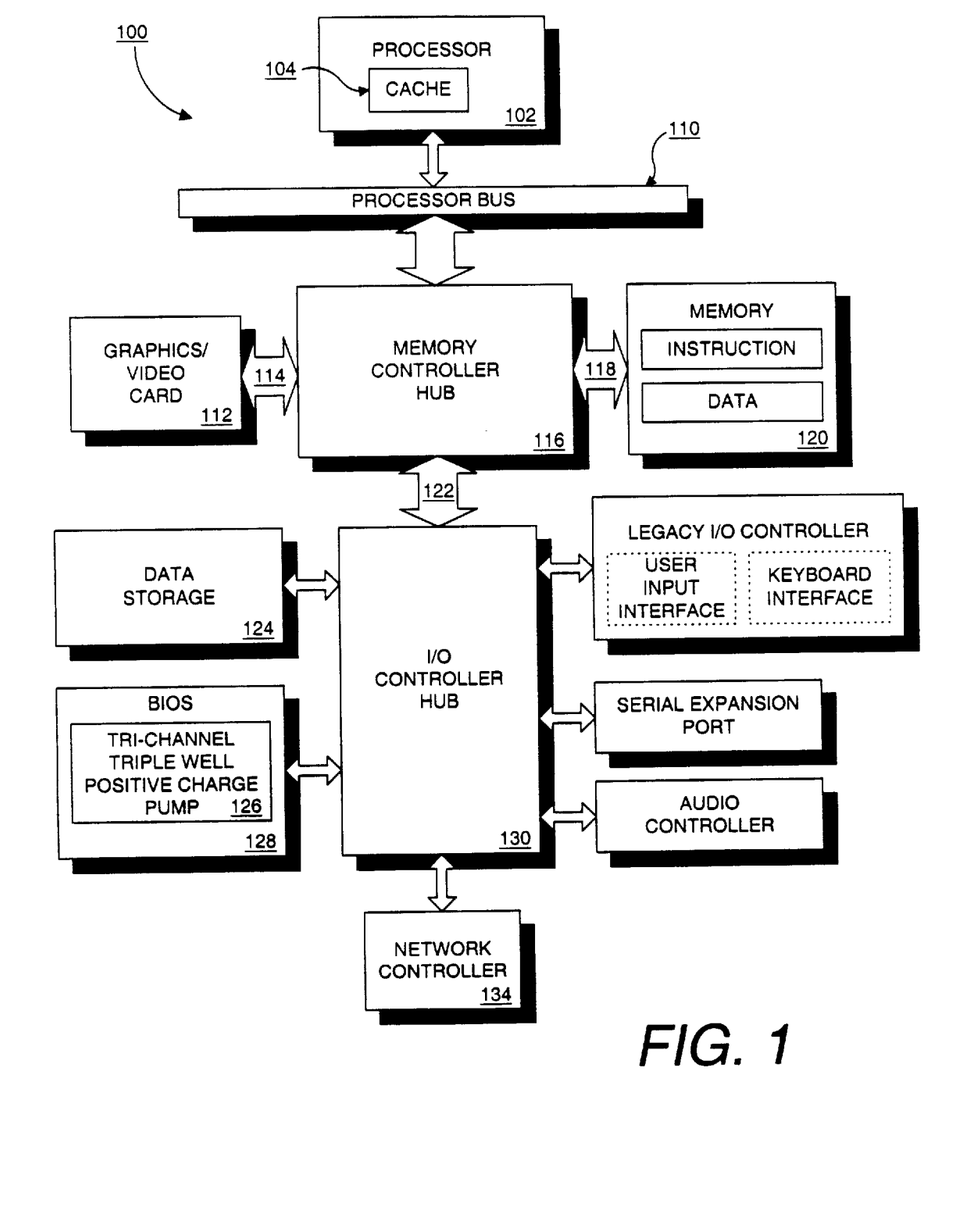
FIG. 1 is one embodiment of a computer system utilizing a gate enhanced tri-channel triple well charge pump.

Referring now to FIG. 1, an exemplary computer system 100 is shown. System 100 includes a component, such as a processor, employing a gate enhanced tri-channel positive charge pump in accordance with the present invention, such as in the embodiment described herein. System 100 is representative of processing systems based on the PENTIUM® Pro, PENTIUM® II, PENTIUM® III, Itanium® microprocessors available from Intel Corporation of Santa Clara, Calif., although other systems (including PCs having other microprocessors, engineering workstations, set-top boxes and the like) may also be used. In one embodiment, sample system 100 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which uses a charge pump for other embodiments.

FIG. 1 is a block diagram of one embodiment of a system 100. System 100 is an example of a hub architecture. The computer system 100 includes a processor 102 that processes data signals. The processor 102 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 1 shows an example of an embodiment of the present invention implemented in a single processor system 100. However, it is understood that other embodiments may alternatively be implemented as systems having multiple processors. Processor 102 is coupled to a processor bus 110 that transmits data signals between processor 102 and other components in the system 100. The elements of system 100 perform their conventional functions well known in the art.

System 100 includes a memory 120. Memory 120 may be a dynamic random access memory (DRAM) device, a static random access memory (SRAM) device, flash memory device, or other memory device. Memory 120 may store instructions and/or data represented by data signals that may be executed by processor 102. A cache memory 104 can reside inside processor 102 that stores data signals stored in memory 120. Alternatively, in another embodiment, the cache memory may reside external to the processor.

A system logic chip 116 is coupled to the processor bus 110 and memory 120. The system logic chip 116 in the illustrated embodiment is a memory controller hub (MCH). The processor 102 communicates to the MCH 116 via a processor bus 110. The MCH 116 provides a high bandwidth memory path 118 to memory 120 for instruction and data storage and for storage of graphics commands, data and textures. The MCH 116 directs data signals between processor 102, memory 120, and other components in the system 100 and bridges the data signals between processor bus 110, memory 120, and system I/O 122. In some embodiments, the system logic chip 116 provides a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices. Some examples are the audio controller, firmware hub (BIOS) 128, data storage 124, legacy I/O controller containing user input and keyboard interfaces, a serial 2o expansion port such as Universal Serial Bus (USB), and a network controller 134. The data storage device 124 can comprise a hard disk drive, a floppy disk drive, a CD-ROM device, a flash memory device, or other mass storage device.

A tri-channel triple well positive charge pump 126 also resides in flash memory BIOS 128. Alternate embodiments of a gate enhanced tri-channel charge pump 126 can also be used in microcontrollers, embedded processors, graphics devices, DSPs, and other types of logic circuits.

For another embodiment of a system, one implementation of a charge pump can be used with a system on a chip. One embodiment of a system on a chip comprises of a processor and a memory. The memory for one system is a flash memory. The flash memory can be located on the same die as the processor and other system components. Additionally, other logic blocks such as a memory controller or graphics controller can also be located on a system on a chip. By including one embodiment of the present invention on the system on a chip, the flash memory can be enabled to program and erase flash memory cells without requiring a high voltage pin on the system on a chip pin-out. The needed high voltage potentials can be generated on the same die.

Figure 2:
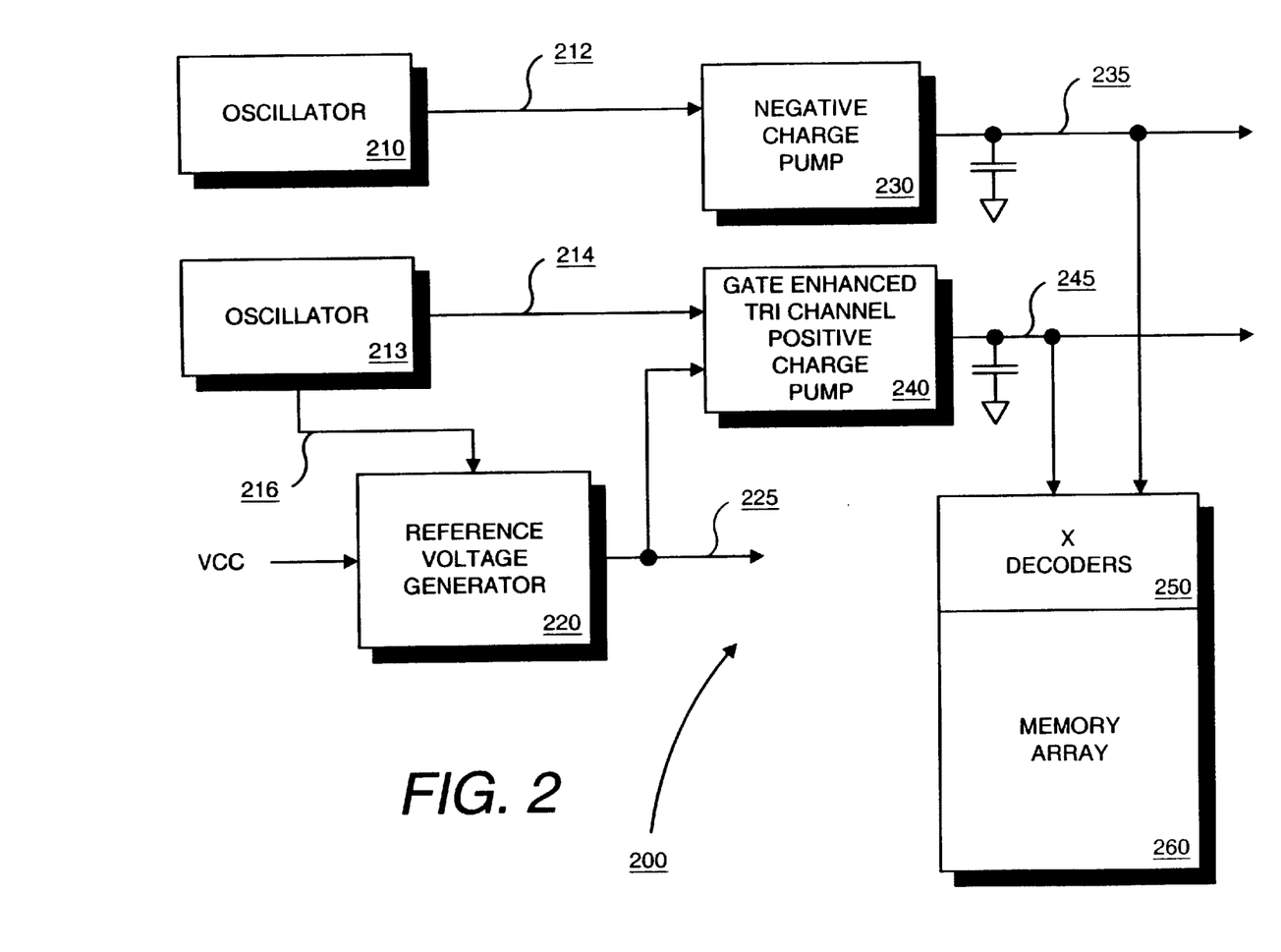
FIG. 2 is a flash memory circuit using a gate enhanced tri-channel positive charge pump of one embodiment.

FIG. 2 is a flash memory circuit 200 using a gate enhanced tri-channel charge pump of one embodiment. Reference generator 220 provides a reference voltage 225 to the positive pump 240. For one embodiment, the positive charge pump 240 is a gate enhanced tri-channel triple well charge pump. The positive pump 240 provides a regulated voltage of approximately five volts over decoder supply line 245 to the X-decoders 250 of the memory array 260. The negative pump provides a voltage of approximately negative five volts over decoder supply line 235 to the X-decoders of memory array 260. A first oscillator 210 provides clock signals 212 that periodically pulses or enables the negative pump 230 during a standby mode. A second oscillator 213 provides clock signals 214, 216 that periodically pulse or enable the positive pump 240 and the reference generator 220, respectively, when they are in a standby mode. The clock signals 212, 214, 216 may each have a different frequency.

Figure 3:
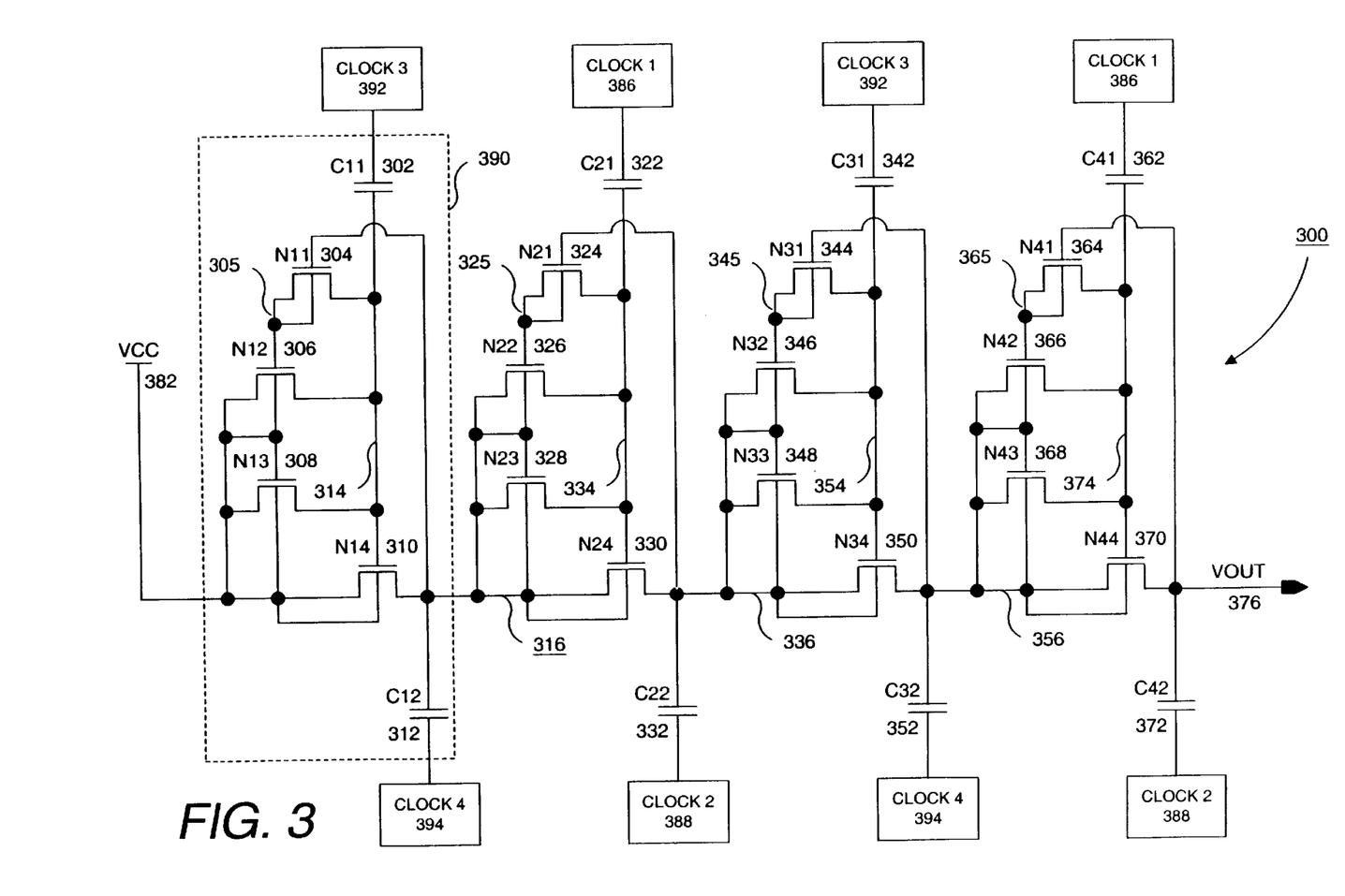
FIG. 3 is a circuit diagram of a four stage gate enhanced tri-channel positive charge pump of one embodiment.
Figure 5:
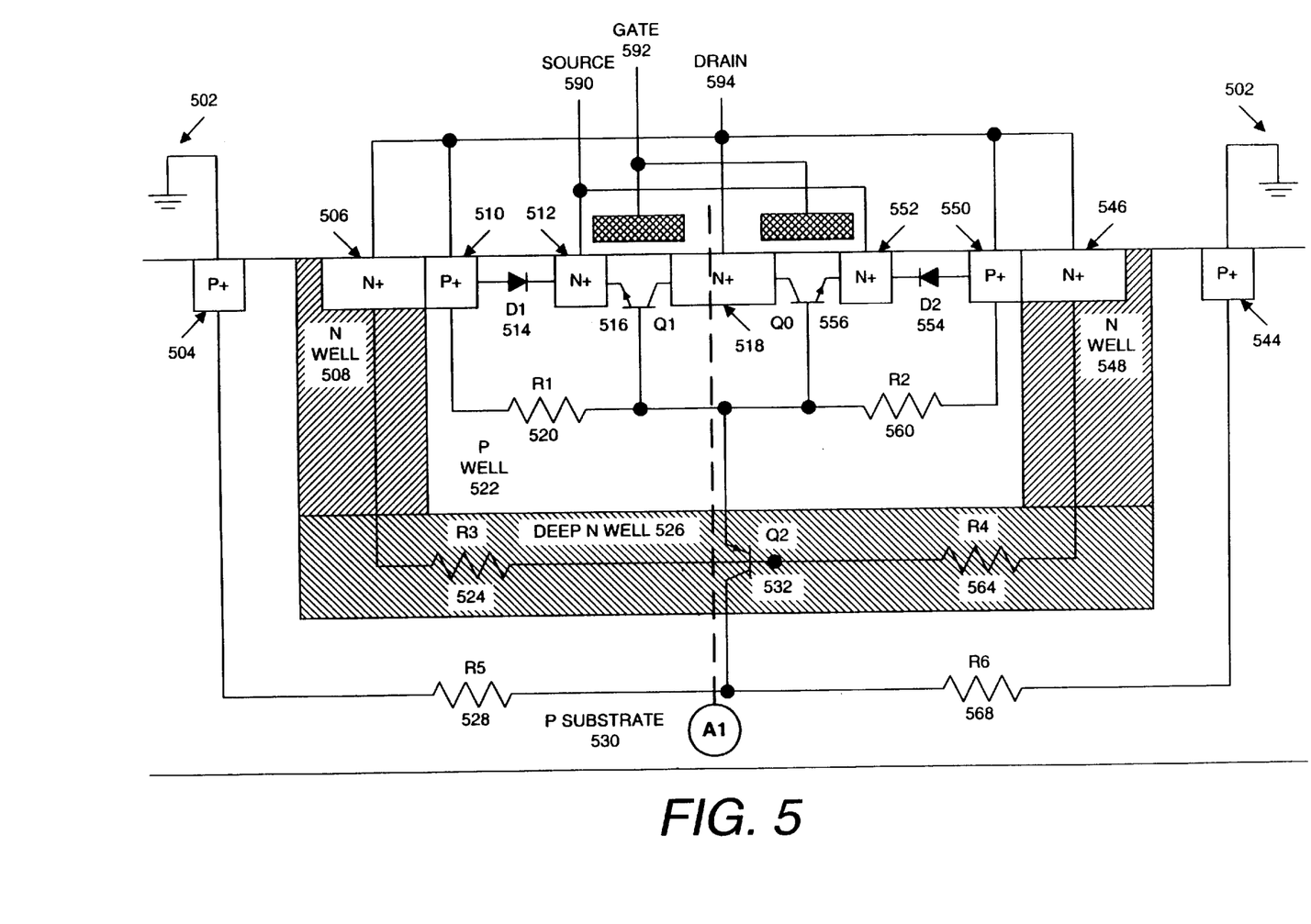
FIG. 5 is a simplified cross-sectional view of a triple well N type transistor layout for a shared drain embodiment.
Figure 6:
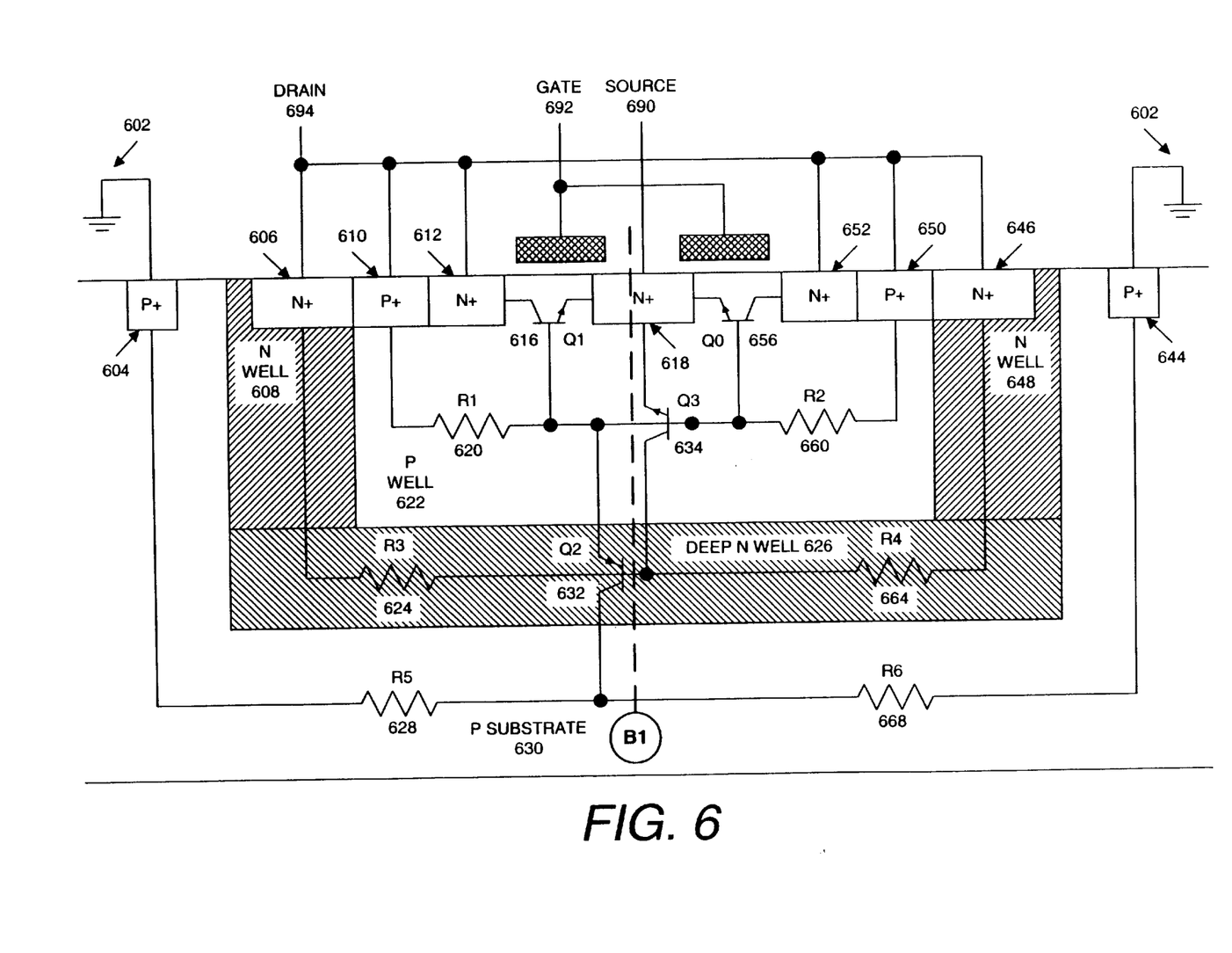
FIG. 6 is a simplified cross-sectional view of a triple well N type transistor layout for a shared source embodiment.

FIG. 3 is a circuit diagram of a gate enhanced tri-channel positive charge pump 300 of one embodiment. The four state positive charge pump 300 of this embodiment comprises of four pump stages. The embodiment of FIG. 3 includes switching transistors N14 310, N24 330, N34 350, N44 370 connected in series between VCC 382 and VOUT 376. The switching transistors N14 310, N24 330, N34 350, N44 370 are preferably triple well N type field effect transistors. The larger sized passing devices N14 310, N24 330, N34 350, and N44 370 of this embodiment have two BJT current channels to help transfer charge in addition to its regular channel underneath the gate region. FIG. 5 below which shows a simplified cross section of one of the legged common drain (or shared drain) passing gates wherein BJT Q0 or Q1 and BJT Q2 are engaged to help charge transfer when the drain and gate terminals are clocked to higher potential. Similarly, FIG. 6 shows a cross section of the legged common source (or shared source) layout version.

The embodiment of FIG. 3 further includes pull-up transistors N13 308, N23 328, N33 348, N43 368. The pull-up transistors N13 308, N23 328, N33 348, N43 368 are triple well N type field effect transistors in this embodiment. The source terminal of pull-up transistor N13 308, N23 328, N33 348, N43 368 is connected to the gate terminal of switching transistors N14 310, N24 330, N34 350, N44 370, respectively. The pull-up transistors N13 308, N23 328, N33 348, N43 368 are diode connected, with the drain terminal and the gate terminal of each pull-up transistor N13 308, N23 328, N33 348, N43 368 connected to the drain terminal of the respective switching transistor N14 310, N24 330, N34 350, N44 370.

The embodiment of FIG. 3 further includes pull-down transistors N12 306, N22 326, N32 346, N42 366. The pull-down transistors N12 306, N22 326, N32 346, N42 366 of this embodiment are triple well N type field effect transistors. The drain terminal of the pull-down transistor N12 306, N22 326, N32 346, N42 366 is connected to the gate terminal of the switching transistor N14 310, N24 330, N34 350, N44 370, respectively. The source terminal of the pull-down transistor N12 306, N22 326, N32 346, N42 366 is connected to the drain terminal of the switching transistor N14 310, N24 330, N34 350, N44 370, respectively. The gate terminal of the pull-down transistor N12 306, N22 326, N32 346, N42 366 is connected to the drain terminal of control device N11 304, N21 324, N31 344, N41 364, respectively.

Some existing charge pumps, such as a charge pump apparatus with diode connected pull-up on boot nodes, have pull-down devices whose gates are connected to the same boot node. In an existing pump scheme, the charge passing device or switching transistor cannot maintain its gate terminal voltage level when its drain terminal voltage drops down during charge transfer. The pull-down diode is gradually turned on in the process. This causes insufficient charge transfer for pump stages that have relatively low threshold voltage switching transistors. One solution is to turn off the pull-down transistor or pull-down diode during charge transfer so that the gate voltage of the switching transistor can be maintained.

For this embodiment of the present invention, a control device serves as a switch between the gate and drain terminals of the pull-down transistor. The control device switches the pull-down transistor from being diode connected or not. Control devices N11 304, N21 324, N31 344, N41 364 are triple well N field effect transistors in this embodiment. The source terminal of control devices N11 304, N21 324, N31 344, N41 364 is connected to the gate terminal of switching transistor N14 310, N24 330, N34 350, N44 370, respectively. The gate terminal of control devices N11 304, N21 324, N31 344, N41 364 is connected to the source terminal of switching transistor N14 310, N24 330, N34 350, N44 370, respectively.

Control devices N11 304, N21 324, N31 344, N41 364 separate the boot node 314, 334, 354, 374 from the gate terminal of diode connected pull-down device N12 306, N22 326, N32 346, N42 366 respectively. The gates of the triple well N devices N11 304, N21 324, N31 344, N41 364 connect to the next higher pump node 316, 336, 356, 376, respectively, and stops the formerly diode connected N12 306, N22 326, N32 346, N42 366 from discharging the boot node 314, 334, 354, 374 while the node is being booted by CLOCK 3 392 or CLOCK 1 386, respectively. By controlling the discharge of boot node 314, 334, 354, 374 through the pull-down device N12 306, N22 326, N32 346, N42 366, respectively, more gate drive is available to the charge transfer device N14 310, N24 330, N34 350, N44 370. Thus more charge can be passed from one pump stage to the next pump stage.

The substrate terminals described in this embodiment are also referred to as the P-well connection of the triple well N type devices. Most of the substrate terminals of the N type transistor devices in each individual pump stage are tied together with the drain terminal of the switching transistor of that stage. The substrate terminals of N12 306, N13 308, and N14 310 are connected together with the drain terminal of N14 310 at VCC 382. The substrate terminals of N22 326, N23 328, and N24 330 are connected together with the drain terminal of N24 330 at node 316. The substrate terminals of N32 346, N33 348, and N34 350 are connected together with the drain terminal of N34 350 at node 336. The substrate terminals of N42 366, N43 368, and N44 370 are connected together with the drain terminal of N44 370 at node 356. Typically, the substrate of an N type device is connected to the most negative supply voltage in the circuit, which is a ground potential, to alleviate the body effect. With the triple well architecture, the well (substrate) can be biased to other voltage potentials and controlled as needed in the particular situation. The stress voltage inside the pump cell may also be reduced as the voltage between the well, which is at the drain potential, and the other junctions can be less than that with a ground potential.

The substrate terminal of the control device N11 304, N21 324, N31 344, N41 364 is not connected together with the other substrate terminals of the other devices in the pump stage. The substrate and drain terminals of each control device N11 304, N21 324, N31 344, N41 364 are connected together with the respective gate terminal of the pull-down device N12 306, N22 326, N32 346, N42 366 in that pump stage.

Also included in the embodiment of FIG. 3 are storage capacitors C12 312, C22 332, C32 352, C42 372. Storage capacitor C12 312 is connected between a CLOCK 4 394 signal and the source terminal of switching transistor N14 310. Storage capacitor C22 332 is connected between a CLOCK 2 388 signal and the source terminal of the switching transistor N24 330. Storage capacitor C32 352 is connected between a CLOCK 4 394 signal and the source terminal of switching transistor N34 350. Storage capacitor C42 372 is connected between a CLOCK 2 388 signal and the source terminal of switching transistor N44 370.

The embodiment of FIG. 3 further includes boot node capacitors C11 302, C21 322, C31 342, C41 362. Boot node capacitor C11 302 is connected between a CLOCK 3 392 signal and the gate terminal of N14 310. Boot node capacitor C21 322 is connected between a CLOCK 1 386 signal and the gate of N24 330. Boot node capacitor C31 342 is connected between a CLOCK 3 392 signal and the gate of N34 350. Boot node capacitor C41 362 is connected between a CLOCK 1 386 signal and the gate of N44 370. For this embodiment, the clock signals 386, 388, 392, 394 are generated by a four phase clock driver which takes its input from an oscillator circuit as in FIG. 2.

Nodes 316, 336, 356, 376 are shown in FIG. 3. Node 316 is defined by the connection of storage capacitor C12 312, the source terminal of switching transistor N14 310, the gate terminal of control device N11 304, the drain terminal of switching transistor N24 330, the gate and drain terminals of pull-up transistor N23 328, and the source terminal of pull-down transistor N22 326. VCC 382 is connected to the drain terminal of N14 310, the gate and drain terminals of N13 308, and the source terminal of N12 306. Node 336 is defined by the connection of C22 332, the source terminal of N24 330, the gate terminal of N21 324, the drain terminal of N34 350, the gate and drain terminals of N33 348, and the source terminal of N32 346. Node 356 is defined by the connection of C32 352, the source terminal of N34 350, the gate terminal of N31 344, the drain terminal of N44 370, the gate and drain terminals of N43 368, and the source terminal of N42 366. Node 376 is defined by the connection of C42 372, the gate terminal of N41 364, and the source terminals of N44 370.

Boot nodes 314, 334, 354, 374 are also shown in FIG. 3. Boot node 314 is defined by the connection of the boot capacitor C11 302, the gate terminal of switching transistor N14 310, the source terminal of pull-up transistor N13 308, the drain terminal of pull-down transistor N12 306, and the source terminal of control device N11 304. Boot node 334 is defined by the connection of C21 322, the gate terminal of N24 330, the source terminal of N23 328, the drain terminal of N22 326, and the source terminal of N21 324. Boot node 354 is defined by the connection of C31 342, the gate terminal of N34 350, the source terminal of N33 348, the drain terminal of N32 346, and the source terminal of N31 344. Boot node 374 is defined by the connection of C41 362, the gate terminal of N44 370, the source terminal of N43 368, the drain terminal of N42 366, and the source terminal of N41 364.

The embodiment of FIG. 3 includes four gate enhanced tri-channel positive charge pump stages. One of these stages is labeled as stage 390, and includes the storage capacitor C12 312, the switching transistor N14 310, the pull-up transistor N13 308, the pull-down transistor N12 306, the control device N11 304, and the boot node capacitor C11 302. Stage 390 receives its input from a VCC supply source 382. The output of this charge pump embodiment is labeled as VOUT 376.

Although the positive charge pump embodiment of FIG. 3 includes four stages, other numbers of stages are possible. Furthermore, the same techniques and teachings of the present invention can be applied to negative charge pumps and other applications wherein a positive or negative voltage potential greater than that of a supply voltage is needed to be generated internally. The present invention can be used in a variety of charge pumps to improve the output current and pumping efficiency. The increased output and efficiency may also lead to die size savings if the size of the charge pumps can be reduced as a result.

Figure 4:
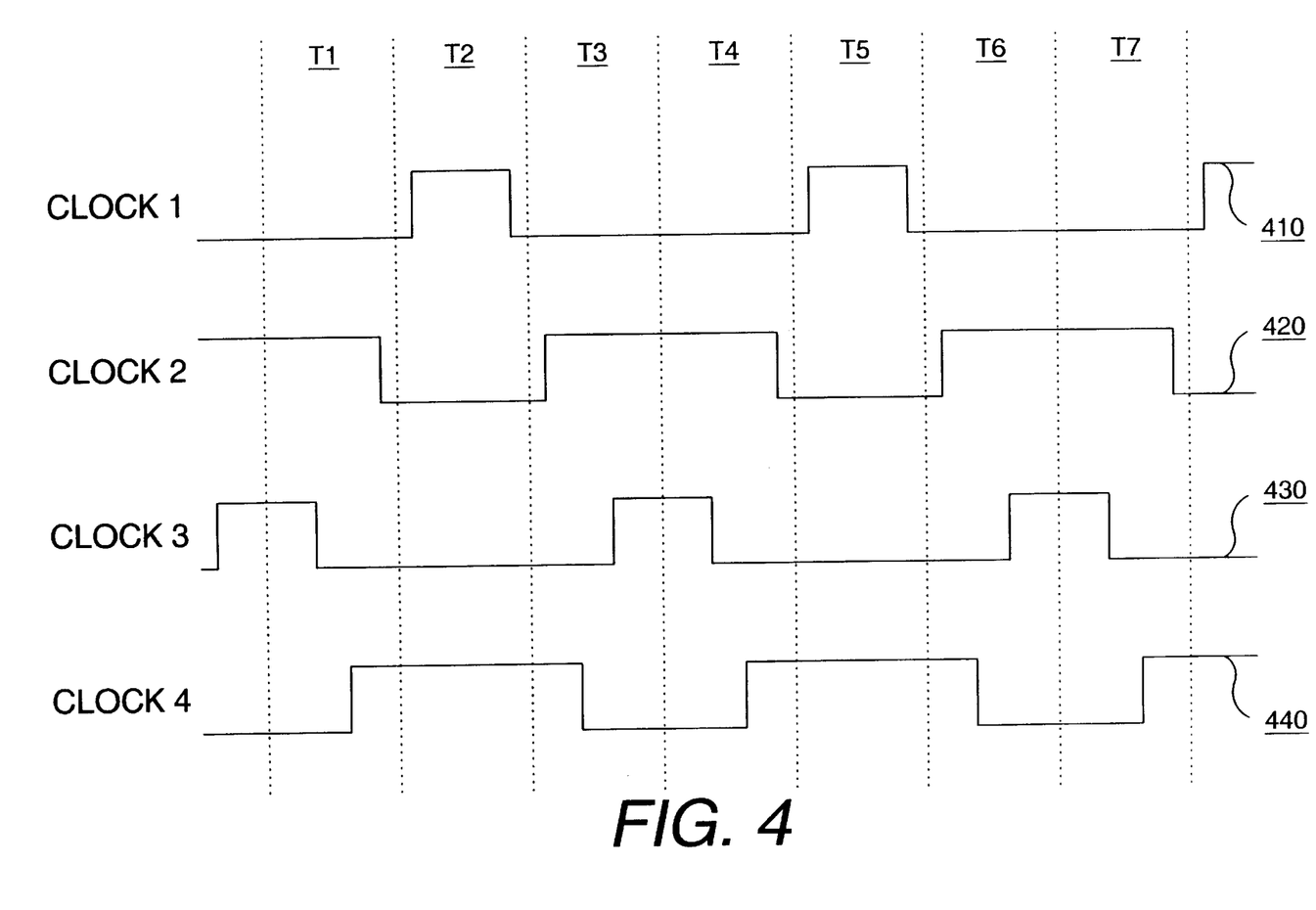
FIG. 4 shows a timing diagram of the pump clocking waveforms used in connection with the positive charge pump of FIG. 3.

FIG. 4 shows a timing diagram of the pump clocking waveforms used in connection with the positive charge pump 300 of FIG. 3. The clock signals CLOCK 1 410, CLOCK 2 420, CLOCK 3 430, CLOCK 4 440 control the operation of this embodiment of a positive charge pump 300. For this embodiment, all of the clock signals 410, 420, 430, 440 are at VCC level when high and at ground potential when low. VCC level varies depending on the particular embodiment and could possibly be 3V, 1.8V, or 1.55V.

The pumping operation can be abbreviated as the following steps and the repeat of those steps to generate currents. The following discussion will concentrate on the operation of pump 300 beginning with the first low-to-high transition of CLOCK 4 440 at time T1. When CLOCK 4 440 is high, the potential at node 316 is boosted high. The high potential at node 316 pre-charges the boot node 334 of the second stage through N23 328 and turns on N11 304. Boot node 334 is charged to a voltage potential of one threshold voltage less than the voltage on node 316. Because of the voltage on boot node 334, switching transistor N24 330 is nearly turned on. As N11 304 turns on, N12 306 is activated to discharge boot node 314 of the first stage 390. Discharging boot node 314 prevents back conductance through N14 310 between node 316 and VCC 382. When CLOCK 2 420 transitions low, the voltage potential at node 336 drops low to be ready to receive charge from C12 312 at node 316 and turns off N21 324. Bipolar junction transistor devices Q0 556 (656) or Q1 516 (616) as shown in FIG. 5 (and 6) below are turned on underneath N24 330 to help transfer charge before the N24 330 is actually turned on. Q2 532 (632) can also be turned on to help transfer charge. When CLOCK 1 410 transitions high, boot node 334 goes high and N24 330 gets turned on. Charge is transferred from C12 312 at node 316 through N24 330 to C22 332 at node 336. The voltage potential at node 316 decreases while the potential at node 336 increases. As CLOCK 1 410 transitions back to a logic low, the charge transfer from node 316 to node 336 stops and the voltage level on the nodes level out.

When CLOCK 2 420 goes high, the voltage potential at node 336 also goes high. C31 342 on boot node 354 is pre-charged by C22 332 through N33 348. The high potential on node 336 also turns on N21 324, which activates N22 326 to discharge boot node 334. Discharging boot node 334 turns off N24 330 to prevent back conductance from node 336 to node 316. When CLOCK 4 440 transitions low at time T3, the voltage potential on C32 352 at node 356 drops low in order to be ready to receive charge from C22 332 at node 336. A low on CLOCK 4 440 also turns off N31 344. Bipolar junction transistor devices Q0 556 (656) or Q1 516 (616) as shown in FIG. 5 (and 6) below are turned on underneath N34 350 to help transfer charge before the N34 350 is actually turned on. Q2 532 (632) can also be turned on to help transfer charge.

As CLOCK 3 430 transitions high during time T3, boot node 354 of the third stage also goes high. A high CLOCK 3 430 turns on switching transistor N34 350. Charge is transferred from C22 332 through N34 350 to C32 352, causing the voltage potential on node 336 to drop and the potential on node 356 to rise. When CLOCK 3 430 goes low during time T4, the charge transfer stops. The potentials on node 336 and node 356 level out. The cycle repeats with the low to high transition of CLOCK 4 440 at time T4.

The embodiment of FIG. 3 eliminates of the requirement of overlapping clock periods typically found with prior charge pump circuits. Overlapping clock periods are not required in the embodiment of FIG. 3 because the voltage on the boot nodes 314, 334, 354, 374 are dependent on the voltages on the nodes 382, 316, 336, 356, respectively, and not on the voltage present at the following stage, as is the case with prior pump circuits. The elimination of the overlapping clocks allows for an increase in clock frequency, which improves pump circuit performance.

Although the clocks signals 410, 420, 430, 440 of FIG. 4 are shown to overlap, in other words no two clock edges are shown to occur simultaneously, there is no requirement for the clocks to overlap. Clock edges may occur nearly simultaneously, although a small overlap, preferably approximately 2 nanoseconds for one embodiment, may be used in order to account for the non-vertical nature of clock edges.

The semiconductor structures and formations of FIGS. 5 and 6 are in general terms in order to avoid obfuscating the present invention. Details related to semiconductor processing and fabrication of metal oxide semiconductor devices are known by those of ordinary skill in the art of semiconductors. FIG. 5 is a simplified cross-sectional view of a triple well N type transistor layout for a shared drain embodiment. The structures of this embodiment are formed on a P type substrate 530. P+ type substrate contacts 504, 544 connect the substrate 530 to a ground potential 502. An N type well including the regions N well 508, deep N well 536, and N well 548 is formed within the P type substrate 530. The N well regions 508, 548 may be doped differently from the deep N well region in some embodiments. N+ type well contacts 506, 546 are located in the N well regions 508, 548. A P type well 522 is formed within the N type well regions 508, 526, 548. P+ type well contacts 510, 546 are formed in the P well 522.

For this embodiment, an N type transistor device is formed in this P well region 522. N+ type doped regions 512, 518, 552 are formed in the P well 522. The N type transistor in the embodiment of FIG. 5 includes two legs with a shared drain region 518. The first leg of the transistor device is on the left side of the A1 line and a second leg is located on the right side of the A1 line. The legging the transistor device in this embodiment of an N type transistor can provide savings in the die area. Instead of having a long transistor device wherein the drain and source regions extend parallel for the needed width, the implement of different legs to a transistor device can allow sharing of the drain region 518 between adjacent legs. Legging can also reduce the size of the needed P type and N type wells. This smaller physical layout of a transistor device can also lead to reduced capacitance from the deep N well.

The source regions of the two legs are formed by the N+ dope regions 512, 552. The shared N+ type doped region 518 serves as the common drain region for the two legs. A first gate resides above the channel region between the source region 516 and drain region 518. A second gate resides above the channel region between the N+ source region 556 and drain region 518. Hence the first leg of the transistor device comprises of an N+ drain region 518, an N+ source region 512, and a gate over the channel region. The second leg of the transistor device comprises of an N+ drain region 518, an N+ source region 552, and a gate over the channel region. The drain region 518 is connected to a drain terminal 594. The N well and P well 522 are also connected to the drain terminal 594 through the respective N+ well contacts 506, 546 and P+ well contacts 510, 550. The gates of the two legs are connected together at the gate terminal 592. Similarly, the source regions 512, 552 are connected together at source terminal 590.

Inherent to the formation of the N type and P type regions in the semiconductor structure are parasitic resistances and PN/NPN/PNP devices. These NPN and PNP devices are also referred to as bipolar junction transistors (BJTs). BJTs are formed in the shared wells of this embodiment. For instance, a PN diode D1 is formed between the P+ well contact 510 and the source region 512 and also between P+ well contact 550 and the source region 552. A lateral parasitic NPN transistor Q1 516 is formed with the N+ drain region 518 as the collector, the P well 522 as the base, and the N+ source region 512 as the emitter. A similar lateral parasitic NPN transistor Q0 556 is formed with the N+ drain region 518 as the collector, the P well 522 as the base, and the N+ source region 552 as the emitter. A vertical parasitic PNP transistor Q2 532 is also formed with the P type substrate 530 as the collector, the deep N well 526 as the base, and the P well 522 as the emitter. The parasitic resistances such as R1 520, R2 560, R3 524, R4 564, R5 528, and R6 568 serve to complete the connection between the terminals of these BJTs Q0 556, Q1 516, Q2 532 and other contacts in the semiconductor.

As described above in the embodiments of FIGS. 3 and 5, the well terminals of the N type transistor devices are coupled to the drain terminal of the N type transistor devices. This circuit arrangement allows for the enabling of the parasitic BJT devices to assist in the transfer of charge between the drain and source terminals of the NMOS transistor devices in triple well semiconductor process technology. By increasing the charge transfer of the N type devices, the efficiency of a charge pump using such transistor devices can also improve. As a result, pump area can be reduced to reflect the higher efficiency, resulting in die savings.

FIG. 6 is a simplified cross-sectional view of a triple well N type transistor layout for a shared source embodiment. The structures of this embodiment are formed on a P type substrate 630. P+ type substrate contacts 604, 644 connect the substrate 630 to a ground potential 602. An N type well including the regions N well 608, deep N well 636, and N well 648 is formed within the P type substrate 630. N+ type well contacts 606, 646 are located in the N well regions 608, 648. A P type well 622 is formed within the N type well regions 608, 626, 648 with P+ type well contacts 610, 646.

N+ type doped regions 612, 618, 652 are formed in the P well 622. The N type transistor in this embodiment includes two legs with a shared source region 618. The first leg of the transistor device is on the left side of the B1 line and a second leg is located on the right side of the B1 line. The implement of different legs to a transistor device can allow sharing of the source region 618 between adjacent legs.

The drain regions of the two legs are formed by the N+ dope regions 612, 652.

The shared N+ type doped region 618 serves as the common source region for the two legs. A first gate resides above the channel region between the source region 618 and drain region 612. A second gate resides above the channel region between the N+ source region 618 and drain region 652. Hence the first leg of the transistor device comprises of an N+ drain region 612, an N+ source region 618, and a gate over the channel region.

The second leg of the transistor device comprises of an N+ drain region 652, an N+ source region 618, and a gate over the channel region. The source region 618 is connected to a drain terminal 690. The gates of the two legs are connected together at the gate terminal 692. Similarly, the drain regions 612, 652 are connected together at drain terminal 694 along with the N well and P well 622 through their respective N+ well contacts 606, 646 and P+ well contacts 610, 650.

Inherent to the formation of the N type and P type regions in the semiconductor structure are parasitic resistances and PN/NPN/PNP devices. A parasitic NPN transistor Q1 616 is formed with the N+ drain region 612 as the collector, the P well 622 as the base, and the N+ source region 618 as the emitter. A similar parasitic NPN transistor Q0 656 is formed with the N+ drain region 652 as the collector, the P well 622 as the base, and the N+ source region 618 as the emitter. A third parasitic NPN transistor Q3 634 is formed with the deep N well region 626 as the collector, the P well 622 as the base, and the N+ source region 634 as the emitter. A parasitic PNP transistor Q2 632 is also formed with the P type substrate 630 as the collector, the deep N well 626 as the base, and the P well 622 as the emitter. The parasitic resistances such as R1 620, R2 660, R3 624, R4 664, R5 628, and R6 668 to complete the connections between the terminals of these BJTs Q0 656, Q1 616, Q2 632, Q3 634 and other contacts in the semiconductor.

Figure 7:
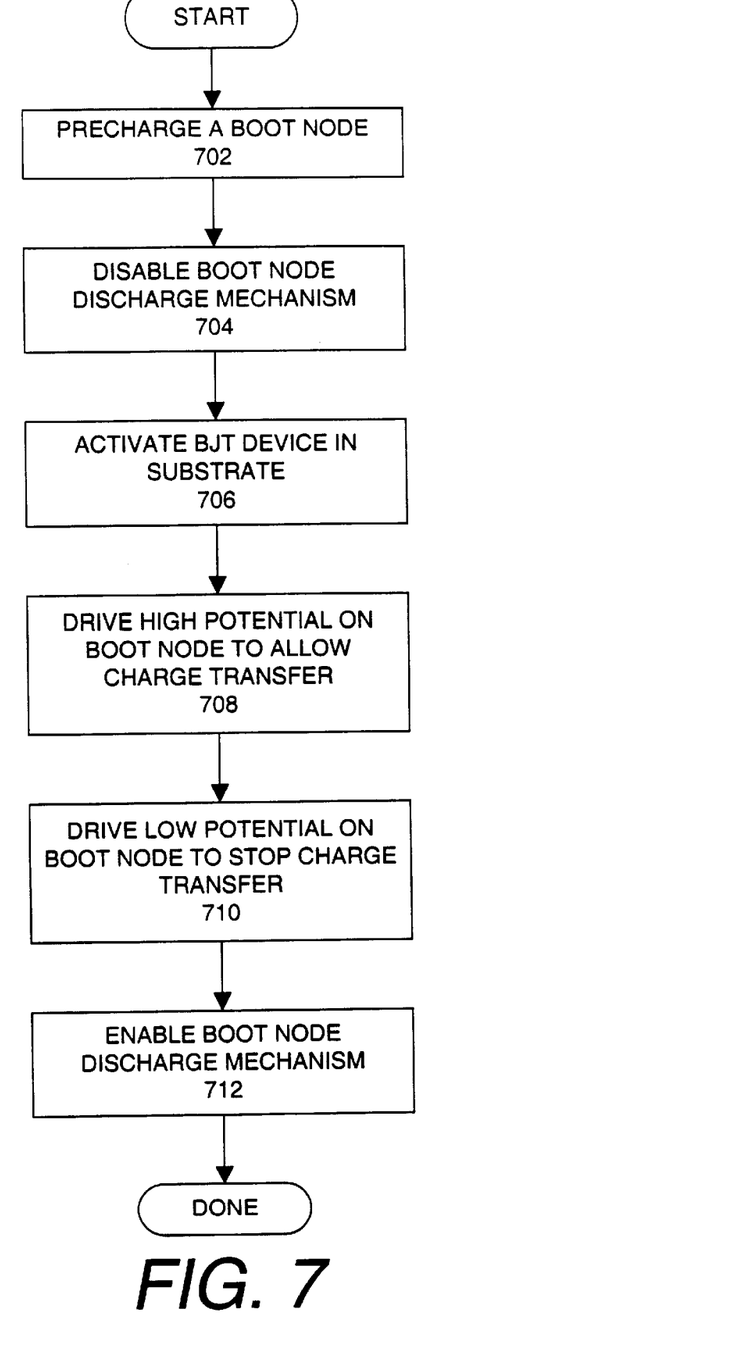
FIG. 7 is a flow diagram illustrating a method for enhancing charge transfer in a triple well charge pump of one embodiment.

FIG. 7 is a flow diagram illustrating a method for enhancing charge transfer in a triple well charge pump of one embodiment. This example generally describes the operation of one pump stage. At step 702, a boot node is precharged. The boot node discharge mechanism is disabled at step 704. This discharge mechanism can be viewed as the pull-down device as in the pump cells of FIG. 3. A BJT device is activated in the substrate at step 706. The BJT device of this embodiment is a lateral BJT underneath the N type transistor device within the P well of the triple well structure. At step 708, a logic high level is driven on the boot node to allow charge transfer to occur. This charge transfer can be related to the charge being passed from a storage capacitor of an earlier stage through a switching device over to a storage capacitor of a subsequent stage. A logic low level is driven on the boot node at step 710 to stop the charge transfer. At step 712, the boot node discharge mechanism is enabled to fully turn off the charge passing device.

The cycle from step 702 to step 712 repeat again and again to continually pass charge from the input of the pump cell to the output of the pump cell. The operation of subsequent pump cells in the charge pump operate in a similar manner, but the clocking are timed differently between adjacent cells in order to properly pump up the voltage.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method of operating a charge pump comprising:
   pre-charging a boot node;
   disabling a boot node discharge mechanism during said pre-charging with a control device, said control device to control a voltage potential on said boot node;
   intentionally activating a bipolar junction transistor within a p type well of a triple well to transfer charge underneath a transistor device during said pre-charging before said transistor device is enabled;
   driving a high potential on said boot node after said pre-charging to allow charge transfer through said transistor device to a pump node;
   driving a low potential on said boot node to stop charge transfer after said pump node increases in potential; and
   enabling said boot node discharge mechanism with said control device to discharge said boot node as said pump node is boosted after said charge transfer.

2. The method of claim 1 wherein said bipolar junction transistor is a lateral bipolar junction transistor in said triple well.

3. The method of claim 1 further comprising biasing said triple well to create a parasitic bipolar junction transistor.

4. An apparatus comprising:
   a switching device to transfer charge from its input terminal to its output terminal upon activation of said switching device;
   a pull-up device having its first terminal coupled to said input terminal and its second terminal coupled to a boot node of said switching device, said pull-up device to precharge said boot node;
   a pull-down device having its first terminal coupled to said input terminal and its second terminal coupled to said boot node, said pull-down device to discharge said boot node when a gate of said pull-down device is turned on;
   a boot capacitor coupled to said boot node, said boot capacitor to hold a first charge on said boot node when a voltage potential on said boot node is boosted with a first clock signal;
   a control device coupled to said pull-down device, said control device activated with a second clock signal to enable and disable said pull-down device by turning on and off said pull-down device; and
   a storage capacitor coupled to said output terminal of said switching device, said storage capacitor to hold a second charge at a pump node, wherein said second charge is boosted with said second clock signal.

5. The apparatus of claim 4 wherein:
   said switching device further comprises a substrate terminal coupled to said input terminal;
   said pull-up device further comprises a substrate terminal couple to said input terminal;
   said pull-down device further comprising a substrate terminal coupled to said input terminal; and
   said control device further comprises a substrate terminal coupled to a drain terminal of said control device.

6. The apparatus of claim 5 wherein said switching device, said pull-up device, said pull-down device, and said control device are formed in a triple well.

7. The apparatus of claim 6 wherein said switching device, said pull-up device, said pull-down device, and said control device are N type field effect transistors.

8. The apparatus of claim 7 wherein said N type field effect transistors have low threshold voltages.

9. The apparatus of claim 5 wherein said substrate terminal of said pull-up transistor is further coupled to a drain terminal of said pull-up transistor and said substrate terminal of said pull-down transistor is further coupled to a drain terminal of said pull-down transistor.

10. The apparatus of claim 9 wherein a first clock source is coupled to said storage capacitor and a second clock source is coupled to said boot capacitor.

11. An integrated circuit device comprising:
   a positive charge pump of at least two pump cells wherein each cell comprises:
      a cell input and a cell output;
      a first transistor coupled to said cell input;
      a first capacitor having its first terminal coupled to a source terminal of said first transistor at said cell output and its second terminal coupled to a first clock signal;
      a second capacitor having its first terminal coupled to a gate terminal of said first transistor and its second terminal coupled to a second clock signal;
      a control device having a gate terminal coupled to said first capacitor and a source terminal coupled to said second capacitor;
      a diode connected transistor comprising an input terminal coupled to a drain terminal of said first transistor, and an output terminal coupled to said gate terminal of said first transistor; and
      a selectively diode connectable transistor comprising a control terminal coupled to a drain terminal of said control device, an input terminal coupled to said gate terminal of said first transistor, and an output terminal coupled to said drain terminal of said first transistor, said selectively diode connectable transistor enabled to pass charge upon activation by said control device;
   wherein a source terminal of said first transistor of a first pump cell is coupled to a drain terminal of said first transistor of an adjacent pump cell; and
   a clock generator to generate said first and second clock signals.

12. The integrated circuit device of claim 11 wherein said clock generator provides a first clock signal to a second capacitor of a second cell, and provides a second clock signal to a first capacitor of a second cell, and provides a third clock signal to a second capacitor of a first cell, and provides a fourth clock signal to a first capacitor of a first cell.

13. The integrated circuit device of claim 12 wherein said diode connected transistor is a second transistor wherein its drain terminal is coupled to its gate terminal to form said input terminal of said diode connected transistor and its source terminal forms said output terminal of said diode connected transistor.

14. The integrated circuit device of claim 13 wherein said selectively diode connectable transistor is a third transistor wherein its source terminal forms said input terminal of said selectively diode connectable transistor, wherein a drain terminal of said second transistor forms said output terminal of said selectively diode connectable transistor, and wherein a gate terminal of said second transistor forms said control terminal.

15. The integrated circuit device of claim 14 wherein said selectively diode connectable transistor is activated when said control device causes said source terminal of said third transistor to be electrically coupled with said drain terminal of said third transistor.

16. The integrated circuit device of claim 15 wherein said control device is a fourth transistor comprising a drain terminal coupled to said control terminal of said selectively diode connectable transistor, a gate terminal coupled to said source terminal of said first transistor, a source terminal coupled to said gate terminal of said first transistor, and a substrate terminal coupled to said drain terminal of said fourth transistor.

17. The integrated circuit device of claim 16 wherein a substrate terminal of said first transistor and a substrate terminal of diode connected transistor and a substrate terminal of said selectively diode connectable transistor are coupled together with a drain terminal of said first transistor.

18. The integrated circuit device of claim 17 wherein said first, second, third, and fourth transistors are N type field effect transistors.

19. The integrated circuit device of claim 18 wherein said device is a flash memory.

* * * * *

UNITED STATES PATENT AND TRADEMARK OFFICE
CERTIFICATE OF CORRECTION

PATENT NO. : 6,686,793 B2
DATED : February 3, 2004
INVENTOR(S) : Li

It is certified that error appears in the above-identified patent and that said Letters Patent is hereby corrected as shown below:

Column 4,
Line 6, after "a serial", delete "2o".

Signed and Sealed this

Eighteenth Day of May, 2004

JON W. DUDAS
*Acting Director of the United States Patent and Trademark Office*